United States Patent [19]
Wesling et al.

[11] Patent Number: 5,852,245
[45] Date of Patent: Dec. 22, 1998

[54] PIEZOELECTRIC PRESSURE SENSOR SUITABLE FOR SENSING PRESSURE AT HIGH TEMPERATURES

[75] Inventors: J. Gregory Wesling, Peoria; Kurtis C. Kelley, Washington; Chuong Q. Dam, Peoria, all of Ill.

[73] Assignee: Caterpillar Inc., Peoria, Ill.

[21] Appl. No.: 768,012

[22] Filed: Dec. 13, 1996

[51] Int. Cl.⁶ .............................. G01L 9/08; G01L 7/08
[52] U.S. Cl. ..................... 73/723; 73/702; 73/DIG. 4; 73/115; 310/338
[58] Field of Search .............................. 73/703, 702, 723, 73/717, 115, DIG. 4; 310/338

[56] References Cited

U.S. PATENT DOCUMENTS

| | | | |
|---|---|---|---|
| 3,801,838 | 4/1974 | Kistler | 310/338 |
| 4,519,254 | 5/1985 | Sonderegger et al. | 73/726 |
| 5,142,914 | 9/1992 | Kusakabe et al. | 73/723 |
| 5,249,468 | 10/1993 | Benedikt et al. | 73/706 |

*Primary Examiner*—George M. Dombroske
*Assistant Examiner*—Joseph L. Felber
*Attorney, Agent, or Firm*—Pankaj M. Khosla

[57] ABSTRACT

A piezoelectric pressure sensor for detecting pressure in a combustion chamber of an internal combustion engine includes a backing plate secured within a housing. The sensor also includes a resilient prestress plate stacked on the backing plate. The resilient plate is formed of silicone elastomer. A sensor element is stacked on the resilient plate. The sensor element is composed of a piezoelectric material formed from a mixture of lead titanate and lead zirconate. A thermally insulating plate is stacked on the sensor element and a diaphragm plate is stacked on the thermally insulating plate and also secured to the housing. The diaphragm plate is exposed to combustion atmosphere and is adapted to transmit a pressure being determined onto the sensor element.

15 Claims, 1 Drawing Sheet

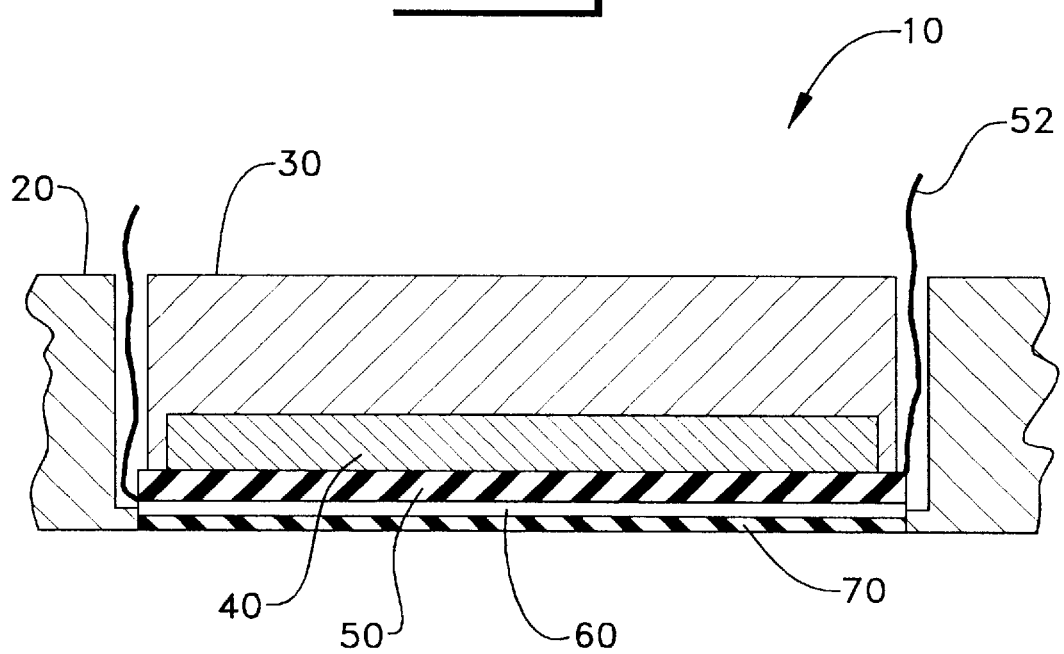

5,852,245

PIEZOELECTRIC PRESSURE SENSOR SUITABLE FOR SENSING PRESSURE AT HIGH TEMPERATURES

TECHNICAL FIELD

The present invention relates generally to piezoelectric pressure sensors for measuring pressure at high temperatures, and more particularly to a piezoelectric pressure sensor mounted within an engine cylinder to detect combustion pressure.

BACKGROUND ART

It is difficult to measure the combustion pressure in the combustion chamber of an internal combustion engine due to the harsh environment posed by the high combustion pressure and temperature. Most in-cylinder pressure sensors operate improperly at temperatures in excess of 2000° C., because of the thermal stresses exerted on the sensor, resulting in a falsified pressure signal. Further, during the threaded installation of a sensor into a sensor housing, the sensor is subjected to tensile or compressive stresses, which also tend to distort the pressure signal. There are some sensor designs, such as those disclosed in U.S. Pat. No. 5,142,914 which utilize prestress applying means, such as a screw, for urging a piezoelectric element against a pressure transmitting means.

It is desirable to have a pressure sensor wherein the piezoelectric element produces a stable sensor output in response to the transmitted pressure signal. It is desirable that the sensor element be capable of providing a stable signal at high temperatures in excess of 2000° C. It is desirable to have a piezoelectric pressure sensor that is protected from corrosion, wear and high temperature during operation. The present invention is directed to overcome one or more problems as set forth above.

DISCLOSURE OF THE INVENTION

In one aspect of the present invention, a piezoelectric pressure sensor for detecting pressure in a combustion chamber of an internal combustion engine is disclosed. The sensor includes a backing plate secured within a housing. The sensor also includes a resilient prestress plate stacked on the backing plate. The resilient plate is formed of silicone elastomer. A sensor element is stacked on the resilient plate. The sensor element is composed of a piezoelectric material formed by mixing lead titanate and lead zirconate in a molar ratio in the range of from about 40:60 lead titanate:lead zirconate to about 60:40 lead titanate:lead zirconate. A thermally insulating plate is stacked on the sensor element and a diaphragm plate is stacked on the thermally insulating plate and also secured to the housing. The diaphragm plate is exposed to combustion atmosphere and is adapted to transmit a pressure being determined onto the sensor element.

BRIEF DESCRIPTION OF THE DRAWINGS

FIG. 1 is a diagrammatic side-view, in section, of a pressure sensor according to an exemplary embodiment of this invention.

BEST MODE FOR CARRYING OUT THE INVENTION

Referring to FIG. 1, which shows a preferred embodiment of the present invention, a piezoelectric pressure sensor 10 for detecting pressure in a combustion chamber of an internal combustion engine comprises a housing 20, a backing plate 30 having a planer surface and being secured within housing 20, a resilient prestress plate 40 having a planer surface and being stacked on the backing plate 30, a sensor element 50 having a planer surface and being stacked on resilient plate 40, a thermally insulating plate 60 having a planer surface and being stacked on sensor element 50, and a diaphragm plate 70 having a planer surface and being stacked on the thermally insulating plate 60.

In the preferred embodiment, the resilient plate is formed of a silicone elastomer such as high temperature resistant silicone rubber, for example. In the preferred embodiment, the sensor element is composed of a piezoelectric material which is formed by mixing lead titanate and lead zirconate in a molar ratio desirably, in the range of from about 40:60 lead titanate:lead zirconate to about 60:40 lead titanate:lead zirconate, and preferably, by mixing lead titanate and lead zirconate in an equimolar ratio. It is desirable to maintain the molar ratio of lead titanate to lead zirconate in the above specified ranges because this molar ratio range represents the best balance between excellent thermal resistance and stable pressure sensing characteristics of the sensor element at high temperatures.

In the preferred embodiment, the thermally insulating plate 60 is formed desirably from one of zirconia, mullite, aluminum oxide, yttria stabilized zirconia, and mixtures thereof, and preferably, of zirconia. In the preferred embodiment, the diaphragm plate 70 is formed of a metal such as steel, for example.

In the preferred embodiment of the present invention, the housing is formed by machining a recess into a flame deck of an internal combustion engine. Desirably, the backing plate 30 is also formed of the flame deck material, and preferably, the backing plate 30 is integral with the housing. The resilient plate desirably has a thickness in the range of from about 4 mm to about 6 mm, and preferably, about 5 mm. The resilient plate serves the function of prestressing the piezoelectric sensor element 50 against the thermally insulating plate 60 and diaphragm plate 70. When the diaphragm plate 70 is subjected to a pressure, it transmits the pressure to the sensor element 50, and element 50 is then stressed against the resilient plate 40. It is undesirable to have a resilient plate having a thickness greater than 6 mm because excessive prestress would be caused. It is undesirable to have a thickness less than 4 mm because not enough cushioning effect would be provided to the sensor element as it is stressed in response to a transmitted pressure.

The thermally insulating plate has a thickness desirably in the range of from about 4 mm to about 6 mm, and preferably, about 5 mm. It is undesirable to have a thickness greater than 6 mm because it would detrimentally affect the sensitivity of the pressure sensor element. It is undesirable to have a thickness less than 4 mm because not enough thermal insulation would be provided to protect the pressure sensor element from the harsh high temperatures encountered in the combustion chamber.

The piezoelectric sensor element has a thickness preferably less than about 1 mm. A thickness greater than about 1 mm is undesirable because it would detrimentally affect the pressure sensitivity of the sensor element. The diaphragm plate desirably has a thickness in the range of about 1 mm to about 2 mm, and preferably, about 1.5 mm. A thickness less than 1 mm is undesirable because the diaphragm plate would not have the structural integrity to withstand the corrosive environment in the combustion chamber. A thickness greater than 2 mm is undesirable because it would detrimentally affect the ability of the diaphragm plate to flex in response to the subjected pressure and transmit the pressure to the pressure sensor element.

In the preferred embodiment, the recess has a cylindrical shape and each of the backing plate, resilient plate, sensor element, thermally insulating plate and diaphragm have the shape of a circular disk. Preferably, the piezoelectric sensor assembly is bonded within the recess formed in a flame deck of an engine by a high temperature resistant ceramic adhesive. One example of such a ceramic adhesive is shown in U.S. Pat. No. 5,468,290, issued on Nov. 21, 1995 to Kurtis C. Kelley, which is hereby incorporated by reference into this specification.

In the preferred embodiment, the cylinder pressure is transmitted to the piezoelectric sensor element through the metallic diaphragm plate and the thermally insulating plate. The metallic diaphragm serves as a barrier to corrosion and wear while the thermally insulating plate limits the amount of heat transmitted to the piezoelectric sensor element. Under an applied load, the sensor element flexes against the resilient plate and creates a voltage potential in the element. This voltage potential can be measured through wires 52, as shown in FIG. 1, which are connected to element 50. The voltage is converted to a pressure reading due to the direct proportionality between the voltage and the pressure. Methods of correlating voltage to pressure are well known to those skilled in the art and need not be explained in further detail here.

In an alternate embodiment, the recesses is formed by machining into the flame deck in a direction toward the flame deck surface, but leaving a thin plate having a thickness in the range of 1 mm to 2 mm. This plate forms the diaphragm plate and thus the diaphragm plate and the flame deck remain as one integral unit with the sensor assembly 10 being bonded into the recess by a ceramic adhesive.

INDUSTRIAL APPLICABILITY

The present invention is particularly useful for forming in-cylinder pressure sensors for sensing the combustion pressure in the combustion chamber of internal combustion engines.

Other aspects, objects and advantages of this invention can be obtained from a study of the disclosure, the drawing and the appended claims.

We claim:

1. A piezoelectric pressure sensor for detecting pressure in a combustion chamber of an internal combustion engine, comprising:

a backing plate having a planar surface, said backing plate being secured within a housing;

a resilient prestress plate having a planar surface and being stacked on said backing plate, said resilient plate being formed of silicone elastomer;

a sensor element having a planar surface and being stacked on said resilient plate, said sensor element being composed of a piezoelectric material formed by mixing lead titanate and lead zirconate in a molar ratio in the range of from about 40:60 lead titanate:lead zirconate to about 60:40 lead titanate:lead zirconate;

a thermally insulating plate having a planar surface and being stacked on said sensor element; and a diaphragm plate having a planar surface and being stacked on said thermally insulating plate, said diaphragm plate also being secured to said housing, and said diaphragm plate being exposed to combustion atmosphere and being adapted to transmit a pressure being determined onto said sensor element.

2. A piezoelectric pressure sensor, as set forth in claim 1, wherein said sensor element is composed of a piezoelectric material formed by mixing lead titanate and lead zirconate in an equimolar ratio.

3. A piezoelectric pressure sensor, as set forth in claim 1, wherein said thermally insulating plate is formed from one of zirconia, mullite, aluminum oxide, yttria stabilized zirconia, and mixtures thereof.

4. A piezoelectric pressure sensor, as set forth in claim 1, wherein said diaphragm plate is formed of a metal.

5. A piezoelectric pressure sensor, as set forth in claim 1, wherein said housing is a recess formed in a flame deck of said internal combustion engine.

6. A piezoelectric pressure sensor, as set forth in claim 5, wherein said backing plate is formed of said flame deck material.

7. A piezoelectric pressure sensor, as set forth in claim 5, wherein said resilient plate has a thickness in the range of about 4 mm to about 6 mm.

8. A piezoelectric pressure sensor, as set forth in claim 5, wherein said thermally insulating plate has a thickness in the range of about 4 mm to about 6 mm.

9. A piezoelectric pressure sensor, as set forth in claim 5, wherein said piezoelectric sensor element has a thickness less than about 1 mm.

10. A piezoelectric pressure sensor, as set forth in claim 9, wherein said piezoelectric sensor element has a thickness of about 0.5 mm.

11. A piezoelectric pressure sensor, as set forth in claim 5, wherein said diaphragm plate has thickness in the range of about 1 mm to about 2 mm.

12. A piezoelectric pressure sensor, as set forth in claim 5, wherein said thermally insulating plate is formed from zirconia.

13. A piezoelectric pressure sensor, as set forth in claim 5, wherein said recess has a cylindrical shape.

14. A piezoelectric pressure sensor, as set forth in claim 13, wherein each of said backing plate, resilient plate, sensor element, thermally insulating plate and diaphragm have a shape of a circular disk.

15. A piezoelectric pressure sensor, as set forth in claim 13, wherein said piezoelectric sensor is bonded within a recess formed in a flame deck of said engine by a ceramic adhesive.

* * * * *